March 29, 1955  H. F. MYERS  2,704,959
PHOTOGRAPHIC EASEL
Filed Aug. 4, 1952

INVENTOR.
Harvey F. Myers
BY
ATTORNEY.

United States Patent Office 2,704,959
Patented Mar. 29, 1955

2,704,959

PHOTOGRAPHIC EASEL

Harvey F. Myers, Kansas City, Mo.

Application August 4, 1952, Serial No. 302,470

3 Claims. (Cl. 88—24)

This invention relates to a device for holding paper in place and more particularly to a photographic easel that includes easily and quickly manipulatable structure for facilitating the production of photographs.

The present invention has for its most important object the provision of an easel to hold photographic paper while the same is being exposed, such as for use in connection with an enlarger, whereby to prevent curling in the paper by holding the same in a perfectly flat condition, thereby eliminating any high spots or areas and preventing improper focus, as well as presenting an even marginal border on the paper for the finished photograph.

Another important object hereof is to provide a photographic easel that includes an open, continuous frame mounted for vertical, reciprocable movement to and from a position engaging the marginal edges of photographic paper to hold the same clamped tightly and against wrinkling, bulging and flaring as is commonly experienced by those skilled in this field when attempting to carry out picture making processes.

Another object hereof is to provide in a photographic easel, a guide tray for receiving the photographic paper above which is disposed the frame mentioned above, such frame being mounted for movement toward and away from the bottom tray.

A further object hereof is to provide a photographic easel that includes a support having a pair of opposed, vertically reciprocable pins for releasably receiving opposed arms on the frame, there being manually operable structure carried by the main support for reciprocating the pins and therefore, the frame toward and away from the bottom of the tray.

Other objects include the way in which the photographic easel hereof is adapted to receive photographic paper of differing sizes; the way in which the entire assembly is made to render the insertion and removal of the paper easy and simple; the way the frame is normally biased to the uppermost end of its path of travel; and the manner of providing a lock for releasably holding the frame in its operative position clamped against the photographic paper within the tray.

Figure 1:
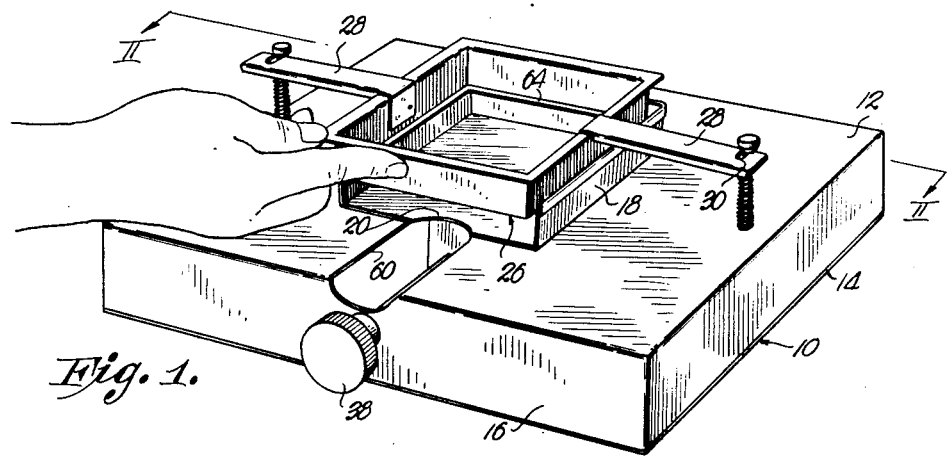
Figure 1 is a perspective view of a photographic easel made pursuant to the present invention.

Those skilled in this field are aware of the need for a photographic easel capable of holding photographic paper in place while the same is being exposed, and though the present invention has been adapted for use particularly in connection with enlargers, its universal application will become manifest after understanding the following detailed description.

There is provided a hollow, preferably polygonal body 10, having a top 12, a removable bottom plate 14, and a plurality of side walls as shown, that includes a normally front wall 16. The uppermost surface 12 is adapted to support a relatively shallow, open top tray 18 having but three vertical sides as is clear in Fig. 1, leaving one open end adjacent a finger clearing notch 20 formed in the bottom of tray 18.

Figure 3:
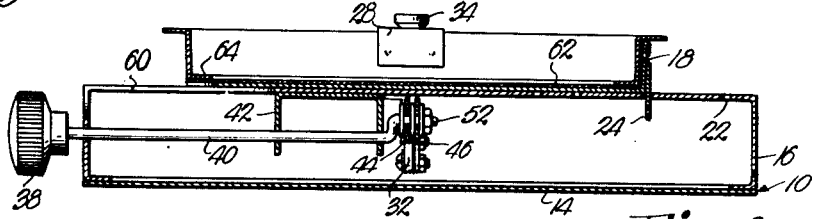
Fig. 3 is a vertical, transverse, cross-sectional view taken on line III—III of Fig. 2.
Figure 4:
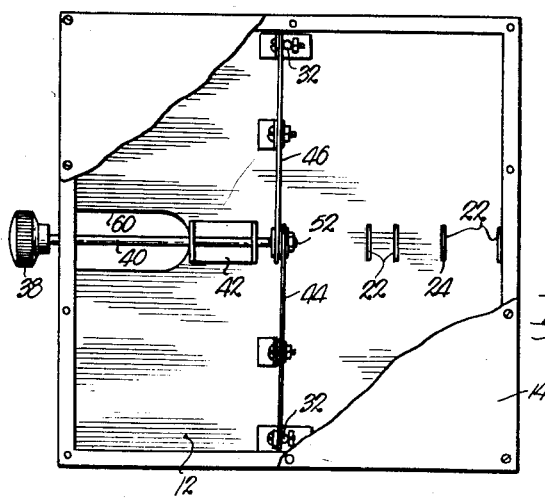
Fig. 4 is an inverted view, parts being broken away to reveal details of construction.

The top wall 12 has a plurality of slots 22, one of which is adapted to receive a finger 24 on the rearmost end of tray 18 and depending therefrom as shown in Fig. 3.

Figure 2:
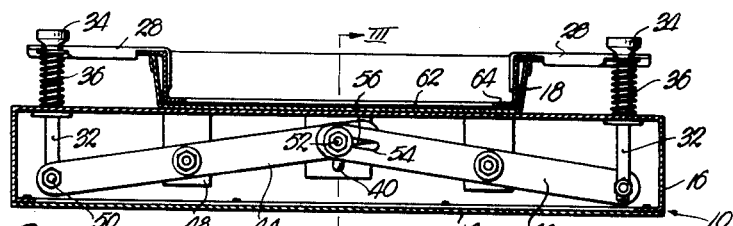
Fig. 2 is a transverse, cross-sectional view taken on line II—II of Fig. 1.

A polygonal frame broadly designated by the numeral 26 is releasably mounted on the body 10, directly above the tray 18. To this end, the frame 26 has a pair of opposed arms 28 rigid thereto, each of which is in turn provided with a notch 30 for receiving a corresponding, vertical pin 32. The two pins 32, one on each side of the frame 26 and tray 18, are mounted for vertical reciprocation within the top wall 12 of body 10, and extend thereabove, as well as into the body 10 as shown in Fig. 2. Each pin 32 has a head 34 thereon beneath which the arms 28 are disposed, and a spring 36 coiled about the pins 32 is interposed between the upper surface of top 12 and the arm 28. Springs 36 not only serve to hold the arms 28 connected to the pins 32, but yieldably hold the latter biased to the uppermost ends of their paths of travel. Pins 32 are retracted downwardly through rotation of an actuating knob 38 exteriorly of body 10 on a shaft 40 that extends through and rotates within wall 16.

A U-shaped bracket 42 depending from wall 12 within the body 10 presents a bearing for the shaft 40. A pair of elongated arms 44 and 46 within the body 10, are pivotally mounted on brackets 48 depending from wall 12 for swinging movement on spaced, parallel, horizontal axes, pivot pins 50 interconnecting arms 44 and 46 at one end thereof with the pins 32 adjacent their lowermost ends.

Shaft 40 has an offset crank 52 on its innermost end that passes through slots 54 and 56 in arms 44 and 46 respectively. It is noted that the arms 44 and 46 are relatively overlapped at their innermost ends, placing the slots 54 and 56 thereof in alignment for receiving the crank 52. Locking means for releasably holding the frame 26 at the lowermost end of its path of travel, is provided by means of a notch 58 in the arm 46 at one end of slot 56 to receive the crank 52 as shown in Fig. 5.

An elongated slot 60 in walls 12 and 16 aligns with notch 20 to clear the fingers of the operator during removal and insertion of a sheet of photographic paper 62 on the bottom wall of tray 18. The outside dimensions of the frame 26 are substantially the same as the inside dimensions of tray 18 and a continuous, inturned flange 64 on the frame 26, rests flatly on the paper 62 at the marginal edges of the latter, clamping the paper 62 tightly against the bottom wall of the tray 18 when the knob 38 is manipulated to lower frame 26 into the tray 18.

While the manner of operation of the easel forming the subject matter hereof, has been set forth above, it is to be pointed out that the sheet of photographic paper 62 to be exposed, is first inserted at the open end of tray 18 upon the bottom wall thereof, whereupon knob 38 is rotated in one direction to bring the flange 64 tightly against the upper surface of paper 62 at its marginal edges only. This holds the paper 62 flat and ready for exposure, whereupon the knob 38 may again be operated to release the tray 26 and the paper 62 removed from tray 18.

Figure 5:
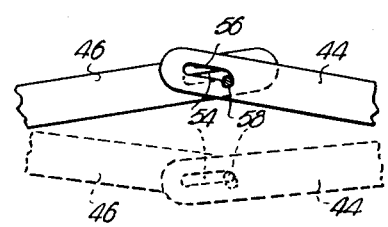
Fig. 5 is a fragmentary, detailed, cross-sectional view illustrating the releasable lock for the pin actuating arms.

It is seen that springs 36 normally hold the arms 28 in the position shown in Fig. 1 of the drawing, and the arms 44 and 46 in the position shown by dotted lines in Fig. 5. When the shaft 40 is rotated in one direction, arms 44 and 46 are swung on brackets 48 to shift the pins 32 downwardly against the action of springs 36 to the position shown by Fig. 2 and by full lines in Fig. 5. Crank 52 will slip in place within the notch 58 and frame 26 will remain at the lowermost end of its path of travel until knob 38 is again manipulated.

There is shown but one tray 18 and one frame 26 in the drawing. It is contemplated however, that there be provided a tray and a frame for each photograph size, the lengths of the arms 28 will therefore, vary and since each tray 18 will have a finger 24 thereon, the slot 22 that is utilized will depend upon which tray is used.

The simple manner of mounting tray 18 on the body 10 and the easy release for arms 28 so far as the pins 32 are concerned, facilitates rapid changing of the units as desired and as determined by the size of the sheet of photographic paper 62 to be exposed.

Another factor of importance is that the device hereof is well adapted for automatic operation. In other words, the shaft 40 might well be coupled with a prime mover if desired and timing means could also be included for releasing the frame 26 after a predetermined period of exposure.

The side walls of tray 18 are sloped outwardly as shown, to facilitate insertion of paper 62 and to center the same on the bottom of tray 18 as frame 26 is brought down against paper 62. The ends of the side walls may also be sloped outwardly to provide a flared entrance for paper 62.

Having thus described the invention what is claimed as new and desired to be secured by Letters Patent is:

1. A photographic easel comprising a tray support; a tray mounted on the support; a frame fitted within the tray and having a continuous lowermost edge; a pair of vertically reciprocable members on the support; means attaching the frame to the members; and structure connected with the members for lowering the same to move said frame to an operative position when said edge thereof engages the marginal edges of a sheet of material to hold the latter clamped against the bottom of the tray, said structure including a pair of arms swingably secured to the support, each arm being pivotally coupled with a member at one end thereof, and a rotatable crank shaft connected with the other ends of the arms for swinging the same.

2. A photographic easel comprising a tray support; a tray mounted on the support; a pair of vertically reciprocable members on the support; a frame fitted within the tray, said frame being mounted on said members and having a continuous lowermost edge; means on said members for holding the frame yieldably biased away from the support; and structure connected with the members for lowering the same to move said frame to an operative position when said edge thereof engages the marginal edges of a sheet of material to hold the latter clamped against the bottom of the tray, said structure including a pair of arms swingably secured to the support, each arm being pivotally coupled with a member at one end thereof, and a rotatable crankshaft connected with the other ends of the arms for swinging the same.

3. A photographic easel comprising a tray support; a tray mounted on the support; a pair of vertically reciprocable members on the support; a frame fitted within the tray, said frame being mounted on said members and having a continuous lowermost edge; means on said members for holding the frame yieldably biased away from the support; structure connected with the members for lowering the same to move said frame to an operative position when said edge thereof engages the marginal edges of a sheet of material to hold the latter clamped against the bottom of the tray, said structure including a pair of arms swingably secured to the support, each arm being pivotally coupled with a member at one end thereof, and a rotatable crankshaft connected with the other ends of the arms for swinging the same; and a releasable lock on said arms for holding the frame in said operative position.

References Cited in the file of this patent

UNITED STATES PATENTS

| | | |
|---|---|---|
| 1,545,390 | Barron | July 7, 1925 |
| 2,153,159 | Schubert | Apr. 4, 1939 |
| 2,235,463 | Porcelli | Mar. 18, 1941 |
| 2,300,264 | Morin | Oct. 27, 1942 |

FOREIGN PATENTS

| | | |
|---|---|---|
| 628,053 | Germany | Mar. 27, 1936 |